(12) United States Patent
Decker et al.

(10) Patent No.: US 9,673,893 B2
(45) Date of Patent: Jun. 6, 2017

(54) SAFETY-ENHANCED LASER ARRAY (71) Applicant: Oracle International Corporation, Redwood City, CA (US)

(72) Inventors: Patrick J. Decker, San Diego, CA (US); Ashok V. Krishnamoorthy, San Diego, CA (US); Xuezhe Zheng, San Diego, CA (US); Ola Torudbakken, Olso (NO)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 14/815,857

(22) Filed: Jul. 31, 2015

(65) Prior Publication Data
US 2016/0277098 A1 Sep. 22, 2016

Related U.S. Application Data (60) Provisional application No. 62/136,211, filed on Mar. 20, 2015.

(51) Int. Cl.
| | |
|---|---|
| *H04B 10/00* | (2013.01) |
| *H04B 10/03* | (2013.01) |
| *H04B 10/50* | (2013.01) |
| *H04B 10/564* | (2013.01) |
| *H04B 10/40* | (2013.01) |
| *H04B 10/80* | (2013.01) |

(52) U.S. Cl.
CPC ............ *H04B 10/03* (2013.01); *H04B 10/40* (2013.01); *H04B 10/503* (2013.01); *H04B 10/564* (2013.01); *H04B 10/801* (2013.01); *H04B 2210/08* (2013.01)

(58) Field of Classification Search
CPC ..... H04B 10/03; H04B 10/503; H04B 10/564
See application file for complete search history.

(56) References Cited

U.S. PATENT DOCUMENTS

| | | | |
|---|---|---|---|
| 6,583,899 B1* | 6/2003 | Casanova | H04B 10/077 398/173 |
| 7,062,177 B1 | 6/2006 | Grivna et al. | |
| 8,625,991 B1* | 1/2014 | Sindhu | H04Q 11/0071 372/29.01 |
| 9,066,166 B2* | 6/2015 | Sindhu | H04Q 11/0071 |
| 2002/0149810 A1 | 10/2002 | Brown et al. | |

(Continued)

*Primary Examiner* — Danny Leung
(74) *Attorney, Agent, or Firm* — Park, Vaughan, Fleming & Dowler LLP (57) ABSTRACT

When an unsafe port with a loss of signal is detected, a transceiver may enable one laser in a group of lasers associated with the unsafe port and may disable the remaining lasers. Then, the transceiver may instruct a transmitter associated with the one laser to transmit an optical signal on the unsafe port using a reduced transmit power that is less than a threshold value associated with the Class 1 conditions and at a different time than enabled lasers in other groups of lasers. Alternatively, for a safe port on which valid communication is received, the transceiver may enable lasers in a group of lasers associated with the safe port. Then, the transceiver may instruct transmitters associated with the lasers in this group of lasers to transmit optical signals on the safe port using a normal transmit power for the lasers that is greater than the threshold value.

20 Claims, 4 Drawing Sheets (56) References Cited

U.S. PATENT DOCUMENTS

| | | | |
|---|---|---|---|
| 2003/0002109 A1 | 1/2003 | Hochberg et al. | |
| 2003/0095303 A1 | 5/2003 | Cunningham et al. | |
| 2005/0226279 A1* | 10/2005 | Xu | H04B 10/564 372/9 |
| 2007/0098411 A1* | 5/2007 | Ghera | H04B 10/07955 398/177 |
| 2011/0169522 A1* | 7/2011 | Raj | H03K 19/177 326/10 |
| 2015/0155952 A1* | 6/2015 | Lach | H04J 14/021 398/201 |
| 2015/0358085 A1* | 12/2015 | Trimberger | H04B 10/548 398/118 |
| 2016/0277098 A1* | 9/2016 | Decker | H04B 10/03 |

* cited by examiner

SAFETY-ENHANCED LASER ARRAY

RELATED APPLICATION

This application claims priority under 35 U.S.C. §119 to U.S. Provisional Application No. 62/136,211, entitled "Laser-Array Transmitter Safety Enhancement using Cyclic Quad Bring-Up," by Patrick Decker, Ashok V. Krishnamoorthy, Xuezhe Zheng, and Ola Torudbakken, filed 20 Mar. 2015, the contents of which are herein incorporated by reference in their entirety.

BACKGROUND

Field

The present disclosure relates to techniques for communicating optical signals. More specifically, the present disclosure relates to a transceiver that cycles through groups of lasers having open ports and/or uses reduced transmit power to ensure safe operation.

Related Art

Parallel optical interconnects are widely used in board-to-board, rack-to-rack and box-to-box interconnect applications. In these applications, optical transceivers have aggregate capacity from 40 Gigabits per second to over 300 Gigabits per second. Typically, each optical transceiver provides 1, 4, or 12 separate transmitter channels, and each channel includes a vertical-cavity surface-emitting laser (VCSEL), as well as associated transmitter control and drive electronics. Moreover, each channel of information is usually conveyed on a separate optical fiber. However, products that include up to 24 optical lasers and optical detectors per transceiver are being considered. As data rates per channel have increased, there has been a corresponding increase in the transmit power per channel. In particular, the transmit power is typically dictated by the required optical power at the receiver and the associated loss of the optical link.

While such optical interconnect components are useful for transferring information and can be critical to the performance of the system, these optical interconnects also raise laser-safety concerns, specifically, the eye hazards associated with the use of such laser arrays. The primary laser-radiation hazard associated with VCSELs is caused by thermal effects that can cause injury to the eye. The low divergence angle of such laser light, particularly when used with focusing/collimating lens-based optical couplers (such as those included in low-cost, parallel optical-fiber connector assemblies) may pose a threat because the laser light can cause permanent damage within a fraction of a second (i.e., faster than the blink of an eye). VCSEL radiation, which is in the near-infrared (780-870 nm) range, can be invisible to many people. This increases the risk because this invisibility reduces the efficacy of the natural eye response (the human body's protective blink reflex is only responsive to visible radiation).

Furthermore, the use of VCSEL arrays spaced at a fraction of a millimeter (typically 250 μm) with optical couplers that include collimating optics results in multiple parallel beams that can be simultaneously coupled into the eye. Although the radiation at the near-infrared wavelengths is not visible, it can still be focused by the eye onto the retina with a localized intensity increase of up to 5 orders of magnitude. Therefore, even relatively small levels of laser power per VCSEL in the near-infrared can simultaneously couple into the eye, and can cause high-intensity heating of the human retina, potentially resulting in permanent damage.

Hence, what is needed is a transceiver without the above-described problems.

SUMMARY

One embodiment of the present disclosure provides a transceiver. This transceiver includes: lasers arranged in groups of lasers, where a given group of lasers includes N lasers; transmitters coupled to the lasers. Moreover, the transceiver includes: ports optically coupled to the lasers, where a given port is optically coupled to the given group of lasers, and the ports can be optically coupled to optical fibers and associated optical connectors (such as optical lenses); and receivers optically coupled to the ports. Furthermore, the transceiver includes control logic, electrically coupled to the lasers, the transmitters and the receivers. During operation, for an unsafe port for which a loss of signal indicates that an associated optical fiber has been disconnected or cut, the control logic: enables one laser in a group of lasers associated with the unsafe port; disables remaining lasers in the group of lasers; and instructs a transmitter associated with the one laser to transmit an optical signal on the unsafe port using a reduced transmit power that is less than a threshold value, where the one laser transmits at a different time than enabled lasers in other groups of lasers. Alternatively, for a safe port on which valid communication is received, the control logic: enables lasers in a group of lasers associated with the safe port; and instructs transmitters associated with the lasers in the group of lasers to transmit optical signals on the safe port using a normal transmit power for the lasers that is greater than the threshold value.

Note that the lasers may include vertical-cavity surface-emitting lasers (VCSELs). In other embodiments, the lasers include a silicon photonic modulator.

Moreover, the transceiver may maintain Class 1 conditions on the ports. Consequently, the threshold value may be compatible with Class 1 conditions.

Furthermore, the one laser may transmit the optical signal periodically.

Additionally, each group of lasers may be controlled independently of the other groups of lasers.

In some embodiments, the N lasers correspond to N independent channels. For example, N may be 4, 12 or 16.

Moreover, the valid communication includes: an acknowledgment, a continuous-wave signal and/or data. Furthermore, detecting the loss of signal may include an absence of the valid communication during a time interval.

Additionally, the N groups may be associated with N optical modules.

Another embodiment provides a system that includes: a processor; a memory that stores a program module; and the transceiver. During operation, the program module is executed by the processor.

Another embodiment provides a method for ensuring Class 1 conditions for a transceiver that includes groups of lasers and associated ports, which may be performed by the transceiver.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects,

BRIEF DESCRIPTION OF THE FIGURES

Table 1 provides pseudocode for a safety technique in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a transceiver, a system that includes the transceiver, and a technique for ensuring Class 1 conditions for the transceiver are described. When an unsafe port with a loss of signal is detected, the transceiver may enable one laser in a group of lasers associated with the unsafe port and may disable the remaining lasers. Then, the transceiver may instruct a transmitter associated with the one laser to transmit an optical signal on the unsafe port using a reduced transmit power that is less than a threshold value associated with the Class 1 conditions and at a different time than enabled lasers in other groups of lasers. Alternatively, for a safe port on which valid communication is received, the transceiver may enable lasers in a group of lasers associated with the safe port. Then, the transceiver may instruct transmitters associated with the lasers in this group of lasers to transmit optical signals on the safe port using a normal transmit power for the lasers that is greater than the threshold value.

By ensuring Class 1 conditions, this safety technique may reduce eye hazards and may improve eye safety for high-speed digital computing and switching systems that use transceivers with arrays of lasers and, in particular, vertical-cavity surface-emitting lasers (VCSELs). Therefore, the safety technique may increase the safety of parallel, high-density, high-speed optical links even in the event of an optical-fiber connector disconnect or an unintended break in the optical link that results in an exposed optical fiber or optical-fiber connector. Moreover, the transceiver would not require any warning labels, additional certification or tracking. In addition, the safety technique may be used to re-establish communication once an optical fiber is re-connected. Consequently, the safety technique may allow increased use of the transceiver and the associated optical links and systems.

In the discussion that follows, VCSELs are used as an illustration in the lasers in the transceiver. However, the safety technique may be used with a wide variety of lasers and, more generally, optical sources. For example, the lasers may include a silicon photonic modulator. Note that a VCSEL is a directly-modulated source (e.g., an electrically-modulated source) and a silicon photonic modulator externally modulates a continuous-wave laser source (e.g., using optical modulation).

Moreover, note that laser classifications (such as Class 1 conditions) may be specified by the International Electrotechnical Commission (IEC) 60825-1 standard or the American National Standards Institute (ANSI) Z-136.1 standard. For example, a Class 1 (exempt) laser cannot, under normal operating conditions, emit a hazardous level of optical radiation, and therefore is safe under all conditions of normal use. A Class 1M laser is safe for all conditions of use except when passed through magnifying optics, such as microscopes and telescopes. A Class 2 or low-power visible laser device of 1 mW with wavelengths between 400-700 nm does not have enough output power to injure a person accidentally, but may injure the eye when stared at for a long period.

Figure 1:
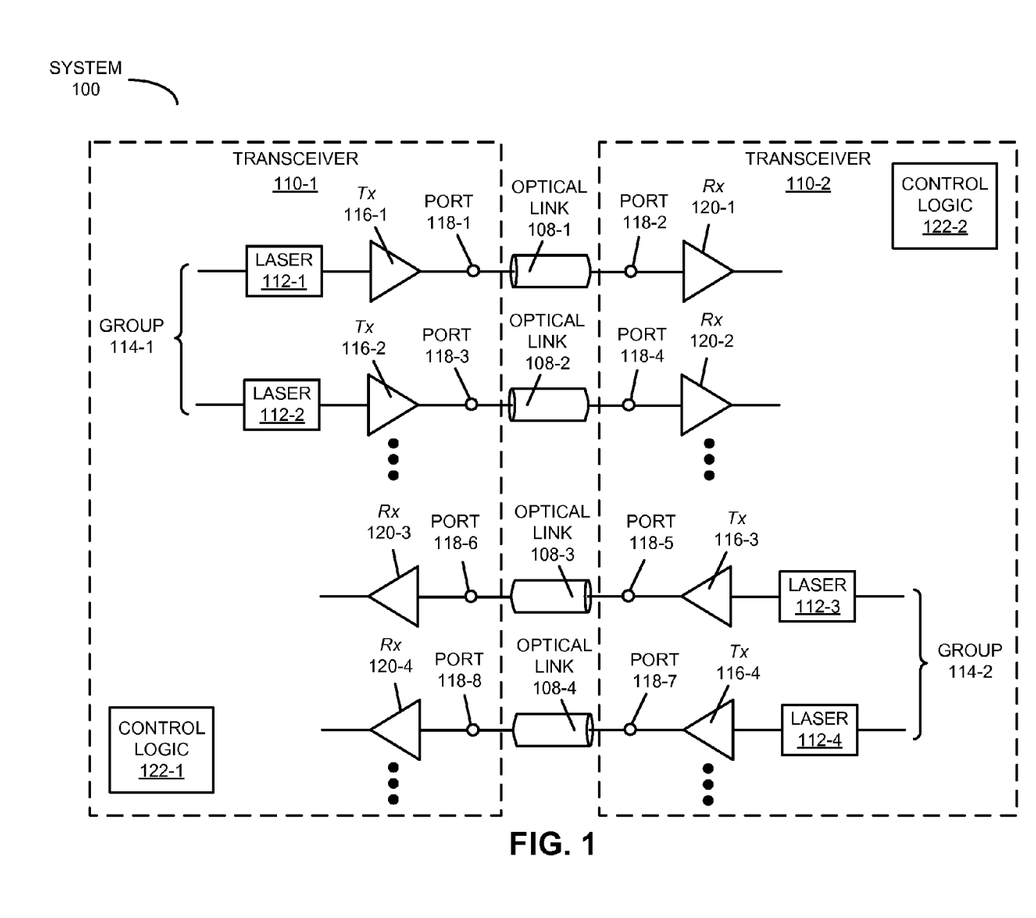
FIG. 1 is a block diagram illustrating a system that includes a transceiver in accordance with an embodiment of the present disclosure.

We now describe embodiments of the optical modulator (which is sometimes referred to as a 'transceiver'). FIG. 1 presents a block diagram illustrating a system 100 that includes transceivers 110. These transceivers may include: lasers 112 (such as VCSELs) arranged in groups 114 of lasers, where a given group of lasers includes N lasers (such as one or more lasers); transmitters (Tx) 116 coupled to the lasers 112. (Note that transmitters 116 may be electrically coupled to lasers 112 in case of a directly-modulated laser, such as a VCSEL or a high-speed distributed feedback laser, or may be optically coupled to lasers 112 in case of an externally modulated laser, such as a Mach Zehnder Interferometer ring or an electro-absorption modulated laser.) Moreover, a given transceiver, such as transceiver 110-1, may include: ports 118 optically coupled to lasers 112, where a given port is optically coupled to the given group of lasers, and ports 118 can be optically coupled to optical fibers 108 (and associated optical connectors, such as optical lenses); and receivers 120 optically coupled to ports 118. Furthermore, transceivers 110 include control logic 122, electrically coupled to lasers 112, transmitters 116 and receivers 120.

Note that, when connected or optically coupled, a given transmitter in a source transceiver (e.g., transceiver 110-1) and a given receiver in a destination transceiver (e.g., transceiver 110-2) may establish a channel in a bidirectional optical link. In some embodiments, the optical link includes four channels (or a quad channel) between ports in transceivers 110. In these embodiments, transceivers 110 may be coupled by a parallel cable with at least eight optical fibers to establish full duplex communication. Moreover, when a cable or connector is unplugged or disconnected so as to break a connection, both directions of communication may be affected. In existing transceivers, if an individual optical fiber breaks within a cable, then the eye-hazard condition may be Class 1M because of the high divergence of the laser light emanating from the optical fiber.

In order to address this problem, during operation, for an unsafe port for which a loss of signal indicates that an associated optical fiber has been disconnected or cut, control logic 122: enables one laser in a group of lasers associated with the unsafe port; disables remaining lasers in the group of lasers; and instructs a transmitter associated with the one laser to transmit an optical signal on the unsafe port using a reduced transmit power that is less than a threshold value (which may be compatible with Class 1 conditions, so transceiver 110-1 can maintain Class 1 conditions on ports 118), where the one laser transmits at a different time than enabled lasers in other groups of lasers. For example, the one laser may transmit the optical signal periodically. However, the transmissions may be non-periodic, such as after a random time interval or as needed. Alternatively, for a safe port on which valid communication is received, control logic 122: enables lasers in a group of lasers associated with the safe port; and instructs transmitters associated with the lasers in the group of lasers to transmit optical signals on the safe port using a normal transmit power for the lasers that is greater than the threshold value.

Note that the group of lasers in transceiver 110-1 may be controlled independently of the other groups of lasers. Moreover, the safety technique may be implemented: per lane (thus, the N lasers may correspond to N independent channels), for a group of two lasers, per quad (i.e., a group of four lasers), for a group of eight lasers, per optical module (i.e., a group of 12 lasers), for a group of 16 lasers, etc. Furthermore, the safety technique may be each transceiver or optical module with or without master knowledge at the system level (such as by a central controller or processor in system 100). In some embodiments, the N groups are associated with N optical modules.

Additionally, the valid communication may include: receiving an acknowledgment from one of receivers 120, receiving a continuous-wave signal and/or receiving data. Furthermore, detecting the loss of signal may include an absence of the valid communication during a time interval (such as 50-100 ms).

In an exemplary embodiment, a transceiver with 12 lasers (N equal to one) operates in an unsafe mode, such that only one laser is on at a given time, and the transmit power for each laser is less than a predefined threshold defined by acceptable eye-safety limits. Alternatively, there may be a transceiver with 12 lasers sub-divided into three groups (or ports) each with N equal to four lasers, of which one or more groups (or ports) are operating in the unsafe mode such that only one laser among the unsafe groups is on at a given time, and the transmit power for each laser is less than a predefined threshold defined by acceptable eye-safety limits. In another embodiment, there are M equal to four transceivers with N equal to 1, 4, or 12 channels (with 12, 3, or 1 port, respectively) collectively operating in an unsafe mode, where one laser in each of the M transceivers may be simultaneously on at a given time, so that the transmit power for each laser in each unsafe port of each transceiver is limited to a quarter of a predefined threshold defined by acceptable eye-safety limits.

We now further discuss the eye hazards associated with transceivers. In the United States American National Standards Institute standardized laser power limits (on peak and average power), the accessible emission limits for a continuous-wave extended optical source at 850 nm are: 1.3 mW for Class 1, 6.5 mW for Class 3R, and 500 mW for Class 3. As noted previously, nearly all the power from a collimated VCSEL (e.g., through a lensed connector) can make it through the aperture of the human eye, even over a distance of several hundred millimeters. These connectors may obviate the possibility of Class 1M system classification that has typically been associated with parallel VCSEL interconnects based on conventional 'MT' style connectors. While the MT-style connectors may expose the optical fiber, the high divergence of the light beams typically cannot be simultaneously coupled into the eye without additional magnification optics.

In contrast, lensed connectors, while more tolerant of connector misalignment and dust, use highly collimated beams with low-divergence angles that can increase the accessible emission. For example, the nominal power from a VCSEL can be up to approximately 1.7 mW per channel. Consequently, a quad may have 6.9 mW (3×), 12 channels may have 20.8 mW, 24 channels may have 41.5 mW, and 48 channels may have 83.0 mW. While there may be some additional loss (because of the air) when such connectors are disconnected, even if up to 0.5 dB loss from fiber to air is assumed, a quad may have 6.34 mW, which is in excess of Class 1. Indeed, in this example it is Class 3R, which poses a correspondingly higher risk of eye injury.

In principle, a physical connector shutter can be used to block laser emission. This can be a first line of defense for eye safety. While such spring-loaded shutters are available at bulkheads where the connectors plug in, they are not typically located at the end faces of the connectors. Moreover, even if system 100 included a shutter, an additional safety mechanism is needed to ensure that system 100 is tolerant of mechanical failures of the shutter. The safety technique implemented in transceivers 110 may reduce the eye hazard when disconnecting multi-channel optical transceivers and lensed connectors. Moreover, the safety technique addresses the dynamic nature of the eye hazard as a function of time, thereby ensuring that the total absorbed energy is maintained below acceptable limits. In addition, the safety technique may allow an optical link to be quickly re-initialized in order re-establish communication between ports in transceivers 110.

One feature in the safety technique is the use of polling to reduce the average power of the lasers in a disconnected optical link. For example, one laser in a group of lasers associated with a disconnected optical link may be used, at reduced power, as a probe or a beacon to determine if the optical link is still disconnected. For example, the active or enabled laser in the group may transmit an approximately 2 ms active burst followed by an approximately 100 ms quiet period to determine if the optical link can be brought up. Whether an optical link is disconnected or if an optical fiber is broken may be determined using a loss-of-signal indicator that is determined by one of receivers 120 for the group. In addition, as described further below with reference to FIG. 2, the active or enabled laser in the group may be cycled with other active lasers in other groups.

Pseudocode illustrating the safety technique is provided in Table 1. If the group included four lasers, there would be three enabled lasers for each 12 channels. Moreover, the low power mode may be −5 dBm, which may ensure that the total power is within Class 1. This power level per channel may be sufficient for receiver detection and low-speed signaling, but may not be sufficient for high-speed signaling at the full data rate. Furthermore, note that many existing optical modules include a 'squelch' mode that attenuates the laser output when valid data is not present in order to reduce 'chatter' or noise associated with spurious data from being received by the receiver end. During the safety technique, when a disconnected optical link is detected, the squelch mode may be disabled for the enabled laser, which may allow the optical link to be brought up after the cable or connector is reconnected.

TABLE 1

Upon assertion of a loss-of-signal indicator for a group of lasers:
    Enable one laser in each group;
    Set a low value of the transmit power;
    Disable squelch on the enabled laser;
    Disable the remaining lasers in the group; and
    Cyclically bring up the enabled laser.

Figure 2:
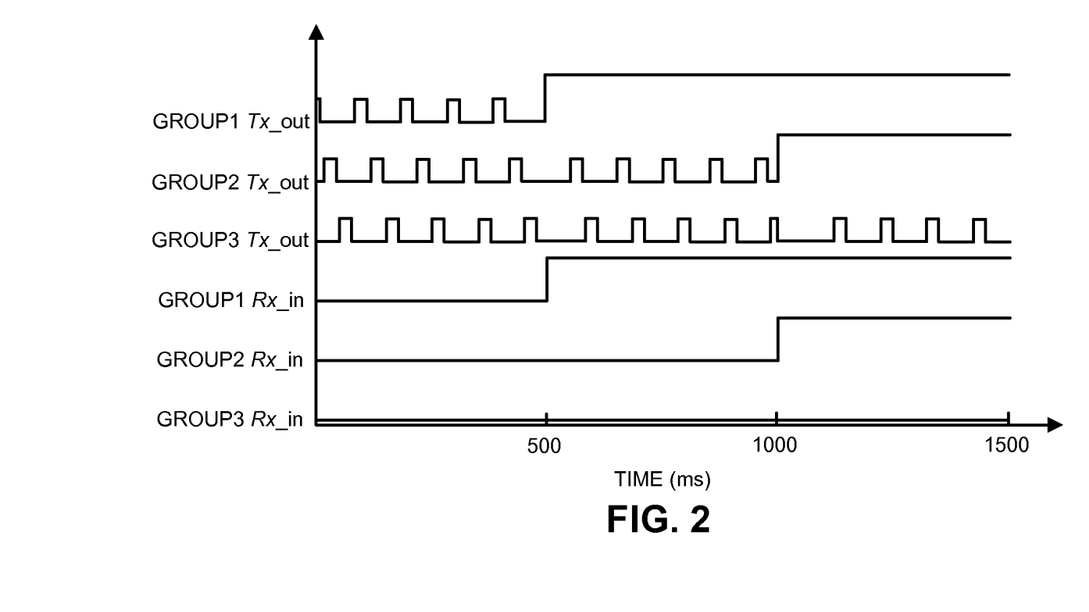
FIG. 2 is a drawing illustrating cyclic operation of groups of lasers as a function of time in accordance with an embodiment of the present disclosure.

FIG. 2 presents a drawing illustrating cyclic operation of enabled lasers in groups of lasers as a function of time (which is sometimes referred to as 'cyclic bring-up'). In this example, there are three groups of four lasers (or quads) in a 12 channel transceiver, with one laser in each group enabled. Up to four such 12 channel laser arrays could be independently connected with a single connector while still maintaining Class 1 conditions even in the worst case where bring-up signals for the quads in the different arrays overlapped in time. As shown in FIG. 2, transmissions from the enabled lasers are staggered in time (such as every 50-100 ms) to provide repeat beacons or probes. If power is received at the corresponding receiver, an acknowledgment may be provided to the transceiver and the lasers in the group may return to full operating mode and their normal duty cycle. Note that if one laser in a group is on or transmitting, it is still eye safe. Moreover, if one laser in a group detects an optical signal or valid communication, then the entire group may be considered ok (i.e., the entire group may return to a normal operating mode).

During cyclic bring-up, an enabled first laser in a first transmitter group in a first transceiver may be periodically used in a low-power mode to re-establish communication with a corresponding first detector in a second receiver group in a second transceiver. This low-power cyclic operation mode may continue as long as a first receiver group in the first transceiver experiences a loss of signal on the channels in the first receiver group. When this condition is corrected (e.g., when an optical-fiber link is reconnected), a first detector in the first receiver group in the first transceiver indicates that it has received valid communication from a first laser in the second transceiver, and signals locally (within the first transceiver) that all the lasers in the first transmitter group in the first transceiver may be brought up to full power on all the channels in the first transmitter group. A corresponding process may occur at the second transceiver so that it may be brought up based on the re-connection with the first transceiver. This approach may be sequentially applied to the first laser in a second transmitter group in the first transceiver module (and, subsequently, to first lasers in additional transmitter groups in a predetermined order) so as to ensure periodic, non-overlapping bring-up pulses that cyclically communicate to establish connectivity between the first lasers in the transmitter groups and corresponding first detectors in the receiver groups while minimizing accessible laser emission from disconnected optical links.

Note that depending on the total number of groups that can be simultaneously active within the connector, the default enabled transmit power in the low-power mode may be adjusted to ensure minimal eye-hazard risk. In some embodiments, the safety technique combines cyclic bring-up with a polling protocol (such as an InfiniBand polling protocol).

The safety technique may be implemented by the firmware of a parallel optical transmitter, e.g., of 12 channels corresponding to three quads. In this case, the safety technique may protect, in the worst case, for up to four such transmitters combined into a single large connector if each parallel optical transmitter implements the safety technique independently and without knowledge of the other transmitters. Moreover, in this example, bring-up could occur on up to four channels simultaneously while still maintaining Class 1 conditions.

Another embodiment of the safety technique offers protection with an arbitrary number of channels, each from groups originating from different 4× or 12× transmitters combined into a single large connector. In this case, it may be useful to implement the safety technique at the system level using host controls that mimic the sequential quad bring-up at each transceiver. The challenge in this case is that the groups may be at different places or locations within the system, so the safety technique may experience additional bring-up latency (on the order of seconds, as opposed to milliseconds in the previous examples).

In this other embodiment, during the cyclic bring-up, an enabled first laser in a first transmitter group in a first transceiver may be periodically used in a low-power mode to re-establish communication with a corresponding first detector in a first receiver group in a second transceiver. This low-power cyclic operation mode may continue as long as the first receiver group in the second transceiver experiences loss of signal on the channels in the first receiver group. As soon as this condition is corrected (e.g., when the optical-fiber link is reconnected), the first detector in the first receiver group in the second transceiver may indicate or signal that it has received valid communication from the first laser, and may communicate through the system that all the lasers in the first transmitter group in the first transceiver may be brought up to full power on all the channels (subject to any latency associated with this signaling). This approach may be sequentially applied to the first laser in a second transmitter group in the first transceiver module (and subsequently to first lasers in additional transmitter groups in a predetermined order) so as to ensure periodic, non-overlapping bring-up pulses that cyclically communicate to establish connectivity between the first lasers in the transmitter groups and corresponding first detectors in receiver groups while minimizing accessible laser emission from disconnected optical links.

Figure 3:
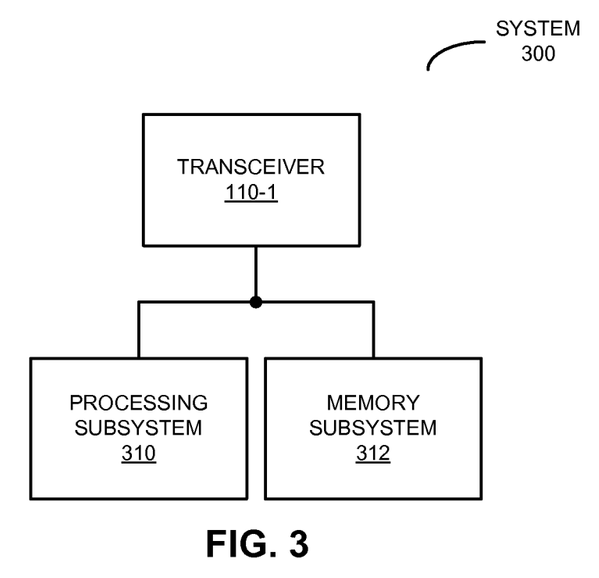
FIG. 3 is a block diagram illustrating a system that includes the transceiver of FIG. 1 in accordance with an embodiment of the present disclosure.

As noted previously, transceiver 110-1 may be included in a system and/or an electronic device. FIG. 3 presents a block diagram illustrating a system 300 that includes transceiver 110-1. In some embodiments, system 300 includes processing subsystem 310 (with one or more processors) and memory subsystem 312 (with memory).

In general, functions of the transceiver and system 300 may be implemented in hardware and/or in software. For example, the safety technique may be performed by a processor on an optical module (between a host and high-speed integrated circuits), which executes firmware. Thus, system 300 may include one or more program modules or sets of instructions stored in a memory subsystem 312 (such as DRAM or another type of volatile or non-volatile computer-readable memory), which, during operation, may be executed by a processing subsystem 310. Note that the one or more computer programs may constitute a computer-program mechanism. Furthermore, instructions in the various modules in memory subsystem 312 may be implemented in: a high-level procedural language, an object-oriented programming language, and/or in an assembly or machine language. Note that the programming language may be compiled or interpreted, e.g., configurable or configured, to be executed by the processing subsystem.

Components in system 300 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 300 may be at one location or may be distributed over multiple, geographically dispersed locations.

System 300 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Moreover, the transceiver can be used in a wide variety of applications, such as: optical communications (for example, in an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, and/or metrology (such as precision measurements of distance).

Furthermore, the embodiments of transceiver 110-1 and/or system 300 may include fewer components or additional components. Although these embodiments are illustrated as having a number of discrete items, these components, transceiver 110-1 and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of transceiver 110-1 and/or system 300 may be implemented more in hardware and less in software, or less in hardware and more in software, as is known in the art.

Figure 4:
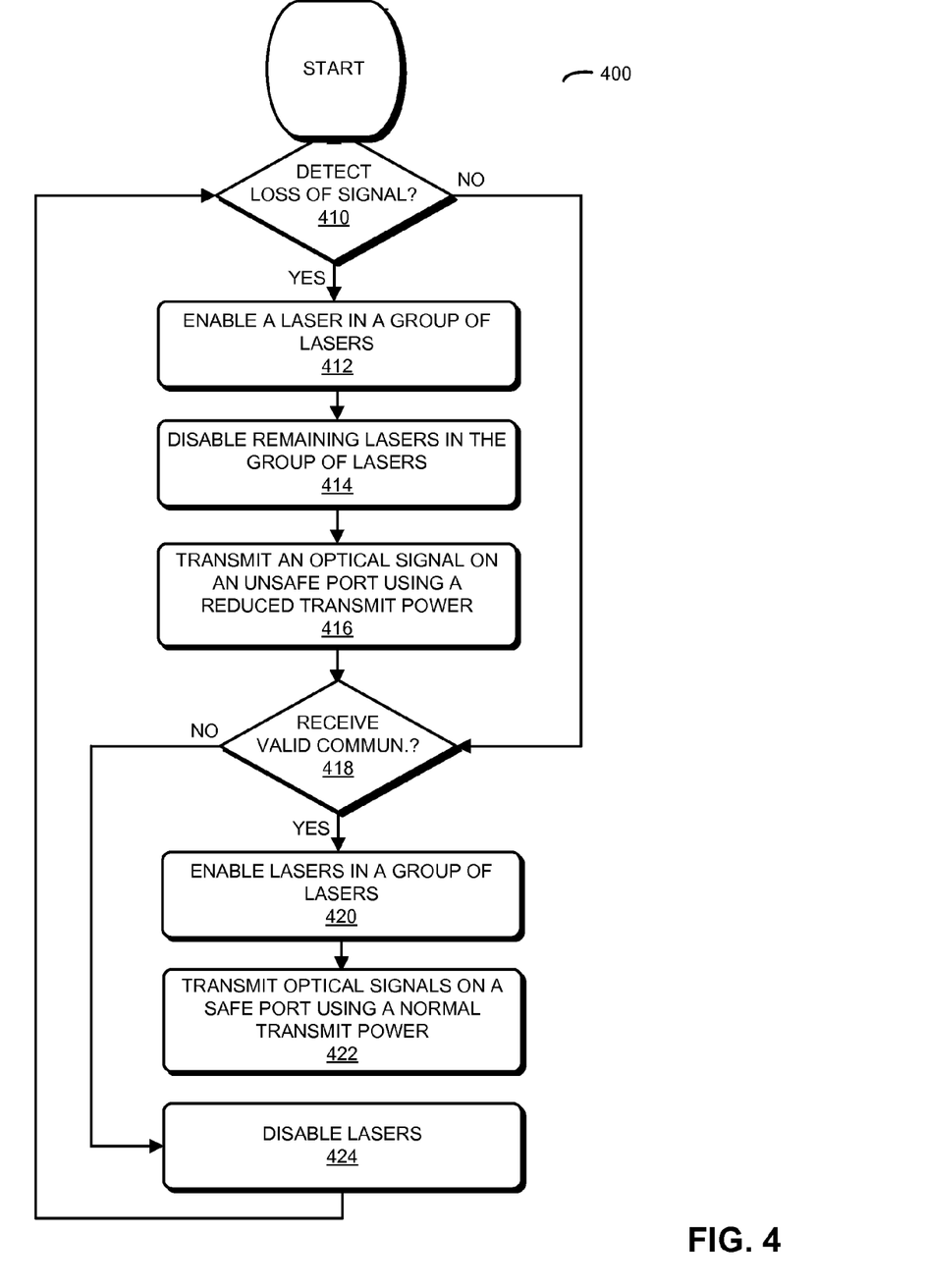
FIG. 4 is a flow chart illustrating a method for ensuring Class 1 conditions for a transceiver that includes groups of lasers and associated ports in accordance with an embodiment of the present disclosure.

We now describe embodiments of a method. FIG. 4 presents a flow chart illustrating a method 400 for ensuring Class 1 conditions for a transceiver that includes groups of lasers and associated ports, which may be performed by a transceiver (such as transceiver 110-1 in FIG. 1). During operation, when the transceiver detects a loss of signal (operation 410) on an unsafe port, which indicates that an optical fiber associated with the unsafe port has been disconnected or cut, the transceiver enables one laser in a group of lasers (operation 412) associated with the unsafe port. Then, the transceiver disables remaining lasers in the group of lasers (operation 414). Moreover, the transceiver instructs a transmitter, associated with the one laser, to transmit an optical signal on the unsafe port using a reduced transmit power (operation 416) that is less than a threshold value (which may be compatible with Class 1 conditions), where the one laser transmits at a different time than enabled lasers in other groups of lasers.

Alternatively, when the transceiver receives a valid communication (operation 418) on a safe port, the transceiver enables lasers in a group of lasers (operation 420) associated with the safe port. Then, the transceiver instructs transmitters, associated with the lasers in the group of lasers, to transmit optical signals on the safe port using a normal transmit power (operation 422) for the lasers that is greater than the threshold value.

Note that, if there is no loss of signal detected (operation 410) and there is no receipt of valid communication within a valid communication window (operation 418), then there could be a firmware or stuck-at problem. In this case, all the lasers may be disabled (operation 424).

In some embodiments of method 400, there may be additional or fewer operations. For example, all the lasers in a group may be disabled, and then one laser may be enabled. Moreover, the order of the operations may be changed, and/or two or more operations may be combined into a single operation.

While the preceding embodiments illustrate the use of the safety technique in conjunction with optical communication (such as in an optical link), the safety technique may be used in applications other than communications, such as: manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:
1. A transceiver, comprising:
lasers arranged in groups of lasers, wherein a given group of lasers includes N lasers;
transmitters coupled to the lasers;
ports optically coupled to the lasers, wherein a given port is optically coupled to the given group of lasers, and wherein the ports are optically coupled to optical fibers and associated optical connectors;

receivers optically coupled to the ports; and control logic, electrically coupled to the lasers, the transmitters and the receivers, which, during operation, for an unsafe port for which a loss of signal indicates that an associated optical fiber has been one of disconnected and cut:

enables one laser in a group of lasers associated with the unsafe port; disables remaining lasers in the group of lasers; and instructs a transmitter associated with the one laser to transmit an optical signal on the unsafe port using a reduced transmit power that is less than a threshold value, wherein the one laser transmits at a different time than enabled lasers in other groups of lasers.

2. The transceiver of claim 1, wherein, during operation, for a safe port on which valid communication is received, the control logic:

enables lasers in a group of lasers associated with the safe port; and instructs transmitters associated with the lasers in the group of lasers to transmit optical signals on the safe port using a normal transmit power for the lasers that is greater than the threshold value.

3. The transceiver of claim 1, wherein the lasers include one of: vertical-cavity surface-emitting lasers (VCSELs); and a silicon photonic modulator.

4. The transceiver of claim 1, wherein the transceiver maintains Class 1 conditions on the ports as specified by the International Electrotechnical Commission (IEC) 60825-1 standard.

5. The transceiver of claim 1, wherein the threshold value is compatible with Class 1 conditions as specified by the International Electrotechnical Commission (IEC) 60825-1 standard.

6. The transceiver of claim 1, wherein the one laser transmits the optical signal periodically.

7. The transceiver of claim 1, wherein each group of lasers is controlled independently of the other groups of lasers.

8. The transceiver of claim 1, wherein the N lasers correspond to N independent channels; and wherein N is one of: 4, 12 and 16.

9. The transceiver of claim 1, wherein the valid communication includes one of: an acknowledgment, a continuous-wave signal and data.

10. The transceiver of claim 1, wherein detecting the loss of signal includes an absence of the valid communication during a time interval.

11. The transceiver of claim 1, wherein the N groups are associated with N optical modules.

12. A system, comprising:

a processor;

a memory, coupled to the processor, that stores a program module, which, during operation, is executed by the processor; and a transceiver, wherein the transceiver includes:

lasers arranged in groups of lasers, wherein a given group of lasers includes N lasers;

transmitters coupled to the lasers;

ports optically coupled to the lasers, wherein a given port is optically coupled to the given group of lasers, and wherein the ports are optically coupled to optical fibers and associated optical connectors;

receivers optically coupled to the ports; and control logic, electrically coupled to the lasers, the transmitters and the receivers, which, during operation, for an unsafe port for which a loss of signal indicates that an associated optical fiber has been one of disconnected and cut:

enables one laser in a group of lasers associated with the unsafe port;

disables remaining lasers in the group of lasers; and instructs a transmitter associated with the one laser to transmit an optical signal on the unsafe port using a reduced transmit power that is less than a threshold value, wherein the one laser transmits at a different time than enabled lasers in other groups of lasers.

13. The system of claim 12, wherein, during operation, for a safe port on which valid communication is received, the control logic:

enables lasers in a group of lasers associated with the safe port; and instructs transmitters associated with the lasers in the group of lasers to transmit optical signals on the safe port using a normal transmit power for the lasers that is greater than the threshold value.

14. The system of claim 12, wherein the threshold value is compatible with Class 1 conditions as specified by the International Electrotechnical Commission (IEC) 60825-1 standard.

15. The system of claim 12, wherein the one laser transmits the optical signal periodically.

16. The system of claim 12, wherein each group of lasers is controlled independently of the other groups of lasers.

17. The system of claim 12, wherein the N lasers correspond to N independent channels.

18. The system of claim 12, wherein the valid communication includes one of: an acknowledgment, a continuous-wave signal and data.

19. The system of claim 12, wherein the N groups are associated with N optical modules.

20. A method for ensuring Class 1 conditions for a transceiver that includes groups of lasers and associated ports as specified by the International Electrotechnical Commission (IEC) 60825-1 standard, wherein the method comprises:

when a loss of signal on an unsafe port indicates that an optical fiber associated with the unsafe port has been one of disconnected and cut:

enabling one laser in a group of lasers associated with the unsafe port;

disabling remaining lasers in the group of lasers; and instructing a transmitter associated with the one laser to transmit an optical signal on the unsafe port using a reduced transmit power that is less than a threshold value, wherein the one laser transmits at a different time than enabled lasers in other groups of lasers.

* * * * *

UNITED STATES PATENT AND TRADEMARK OFFICE
CERTIFICATE OF CORRECTION

PATENT NO.       : 9,673,893 B2
APPLICATION NO.  : 14/815857
DATED            : June 6, 2017
INVENTOR(S)      : Decker et al.

Page 1 of 1

It is certified that error appears in the above-identified patent and that said Letters Patent is hereby corrected as shown below:

On the Title Page

Column 1, under Inventors, Line 5, delete "Olso" and insert -- Oslo --, therefor.

Signed and Sealed this
Thirtieth Day of January, 2018

Joseph Matal
*Performing the Functions and Duties of the
Under Secretary of Commerce for Intellectual Property and
Director of the United States Patent and Trademark Office*